(12) United States Patent
Hubert

(10) Patent No.: US 7,590,235 B2
(45) Date of Patent: Sep. 15, 2009

(54) REDUCTION CALCULATIONS IN ELLIPTIC CURVE CRYPTOGRAPHY

(75) Inventor: Gerardus T. M. Hubert, Geldrop (NL)

(73) Assignee: NXP B.V., Eindhoven (NL)

( * ) Notice: Subject to any disclaimer, the term of this patent is extended or adjusted under 35 U.S.C. 154(b) by 582 days.

(21) Appl. No.: 10/561,896

(22) PCT Filed: Jun. 10, 2004

(86) PCT No.: PCT/IB2004/002011

§ 371 (c)(1),
(2), (4) Date: Dec. 21, 2005

(87) PCT Pub. No.: WO2004/114124

PCT Pub. Date: Dec. 29, 2004

(65) Prior Publication Data

US 2007/0168411 A1    Jul. 19, 2007

(30) Foreign Application Priority Data

Jun. 21, 2003  (GB) .................................. 0314557.0

(51) Int. Cl.
*H04K 1/00*  (2006.01)
*H04L 9/00*  (2006.01)
*H04L 9/28*  (2006.01)
*H04L 9/30*  (2006.01)

(52) U.S. Cl. ........................................ 380/30; 380/28
(58) Field of Classification Search ............. 380/28–30, 380/46; 708/490–492, 498, 501, 503
See application file for complete search history.

(56) References Cited

U.S. PATENT DOCUMENTS

| 5,463,690 | A | 10/1995 | Crandall |
| 6,240,436 | B1 * | 5/2001 | McGregor .................. 708/491 |
| 6,366,673 | B1 * | 4/2002 | Hollmann et al. ............. 380/28 |
| 2002/0010730 | A1 * | 1/2002 | Blaker ........................ 708/491 |
| 2002/0059353 | A1 * | 5/2002 | Koc et al. .................... 708/491 |

OTHER PUBLICATIONS

Arjen K. Lenstra and Eric R. Verheul, Selecting Cryptographic Key Sizes, Aug. 14, 2001, Journal of Cryptology, p. 260.*
Lenstra et al., Selecting Cryptographic Key Sizes, Journal of Cryptology, Aug. 14, 2001, pp. 260.*
Golomb S W et al: "Integer Convolutions Over the Finite Field of GF(3.2N+1)" Siam Journal of Applied Mathematics, vol. 32, No. 2, Mar. 1977.

* cited by examiner

Primary Examiner—Nasser G Moazzami
Assistant Examiner—Trong Nguyen

(57) ABSTRACT

An Elliptic Curve Cryptography reduction technique uses a prime number having a first section of Most Significant Word "1" states, with $N=n_{m-1}+N_1 B+n_0$ and a second section with a plurality of "1" or "0" states. The combination of the first section and the second section is a modulus.

28 Claims, 5 Drawing Sheets

REDUCTION CALCULATIONS IN ELLIPTIC CURVE CRYPTOGRAPHY

The present invention relates to a method of performing a reduction operation and to apparatus for performing a reduction operation.

Elliptic Curve Cryptography (ECC) involves the use of calculations on an elliptic curve relationship over GF(p) and requires the multiplication of long integers which are carried out repeatedly during the implementation of, for example, public key algorithms in cryptographic processors.

Typically, the multiplication operations must be carried out many hundreds of times to complete an encryption or decryption operation, and so it is important that the cryptographic devices that perform these operations execute the long multiplications quickly using a high speed multiplier.

Increasingly, such cryptographic algorithms are used in electronic devices for example smart cards, and in these applications processing capability and power consumption is severely limited.

One conventional calculation method is the Quisquater system which operates on the Most Significant Word using the operation $$R'=R+(-N'*MSW),$$

where N' is a special multiple of N. In fact, −N' is used in its 2's complement notation.

The reduction operation is inefficient, and the result may be too large, necessitating the addition of (−N') to R'.

Another conventional calculation method is the Mongomery system which operates on the Least Significant Word using the operation $$R'=R+N*Q$$

where Q=LSW*M mod 2n.

Again the reduction operation is inefficient and might be one bit too large requiring restoration by subtraction of N.

It is therefore an object of the present invention to provide a more efficient reduction operation.

It is also an object of the present invention to provide a reduction operation with a lower number of multiplication operations.

It is also an object of the present invention to provide a reduction operation which provides fewer overflows in the calculation operations.

It is also an object of the present invention to provide a reduction operation in which the reduction operation is completed faster.

According to one aspect, the present invention provides a method of performing a reduction operation in a cryptographic calculation, the method comprising selecting a modulus having a first section with a plurality of "1" Most Significant Word states and a second section which comprises a plurality of "1" or "0" states whereby the number formed of the two sections is a modulus or a multiple of a modulus, and operating a reduction operation on the modulus/multiple.

By this selection of a particular form of a modulus/multiple for use in the calculation, the reduction operation involves fewer multiplication operations.

Thus a significant benefit provided by the present invention is that the time taken to complete the entire calculating operation is reduced.

Moreover, the degree of security afforded by the method of the present invention is maintained as compared to conventional cryptographic methods.

Preferably the method comprises monitoring the number of leading "1" to determine if the number is less than (k−2).

Advantageously, when the number of leading "1"s is less than (k−2), the next calculation is initiated.

Thus a further advantage of the present invention is that a number of multiplication operations can be processed simultaneously, thereby reducing the time taken to complete calculating operations.

In one embodiment of the present invention for 192-bit ECC and a word size for 64-bit, the modulus comprises a first section of 138 bits and a second section of 54 bits.

In another embodiment of the present invention for 128-bit ECC and a word size of 64-bit, the modulus comprises a first section of 74 bits and a second section of 54 bits.

In another embodiment of the present invention for 256-bit ECC and a word size of 64-bit, the modulus comprises a first section of 202 bits and second section of 54 bits.

The invention can also work with a number of moduli, which have less significant bits than a multiple of the word size. In that case, the system works with a multiple of the modulus, which has the required number of leading 1's. Only at the very last end, the result has to be reduced to the original (smaller) modulus.

In one preferred arrangement, the method of the present invention utilises modulus, consisting of m words with all the words except the Least Significant Word (LSW) consisting of "1"s and the LSW has, for example, ten leading "1"s can be any number but bearing in mind the larger it is, then the less often an additional reduction is required.

According to another aspect, the present invention provides a computer program product directly loadable into the internal memory of a digital computer, comprising software code portions for performing the method of the present invention when said product is run on a computer.

According to another aspect, the present invention provides a computer program directly loadable into the internal memory of a digital computer, comprising software code portions for performing the method of the present invention when said program is run on a computer.

According to another aspect, the present invention provides a carrier, which may comprise electronic signals, for a computer program embodying the present invention.

According to another aspect, the present invention provides electronic distribution of a computer program product, or a computer program, or a carrier of the present invention.

According to another aspect, the present invention provides apparatus for performing a reduction operation in a cryptographic calculation, the apparatus comprising means to select a modulus or a multiple of a modulus having a first section with a plurality of "1" states and a second section having a plurality of "1" or "0" states whereby the number formed of the two sections is a modulus or a multiple of a modulus.

In order that the present invention may more readily be understood, a description is now given, by way of example only, reference being made to the accompanying drawings, in which:

FIG. 1 shows a block diagram of a hardware implementation of the present invention incorporating a smart card 50 with the following components:

Microcontroller 51 for general control to communicate with the outside world via the interface. It sets pointers for data in RAM/ROM and starts the coprocessor.

Interface to the outside world, for contact with smart cards e.g. according to ISO-7816-3.

A Read Only Memory (ROM) 52 for the program of the microcontroller.

A Programmable Read Only Memory (Flash or EEPROM) 53 for the non-volatile storage of data or programs.

RAM 54 for storage of volatile data, e.g for storage of intermediate results during calculations.

Coprocessor 55 dedicated to perform special high-speed tasks for ECC or RSA calculations. When a task is ready, control is returned to the microcontroller.

In a variant, the present invention is implemented in software with a microprocessor, ALU to provide add, subtract, shift operations with programming of the controller to provide control logic, and degree detection by shift registers.

Figure 1:
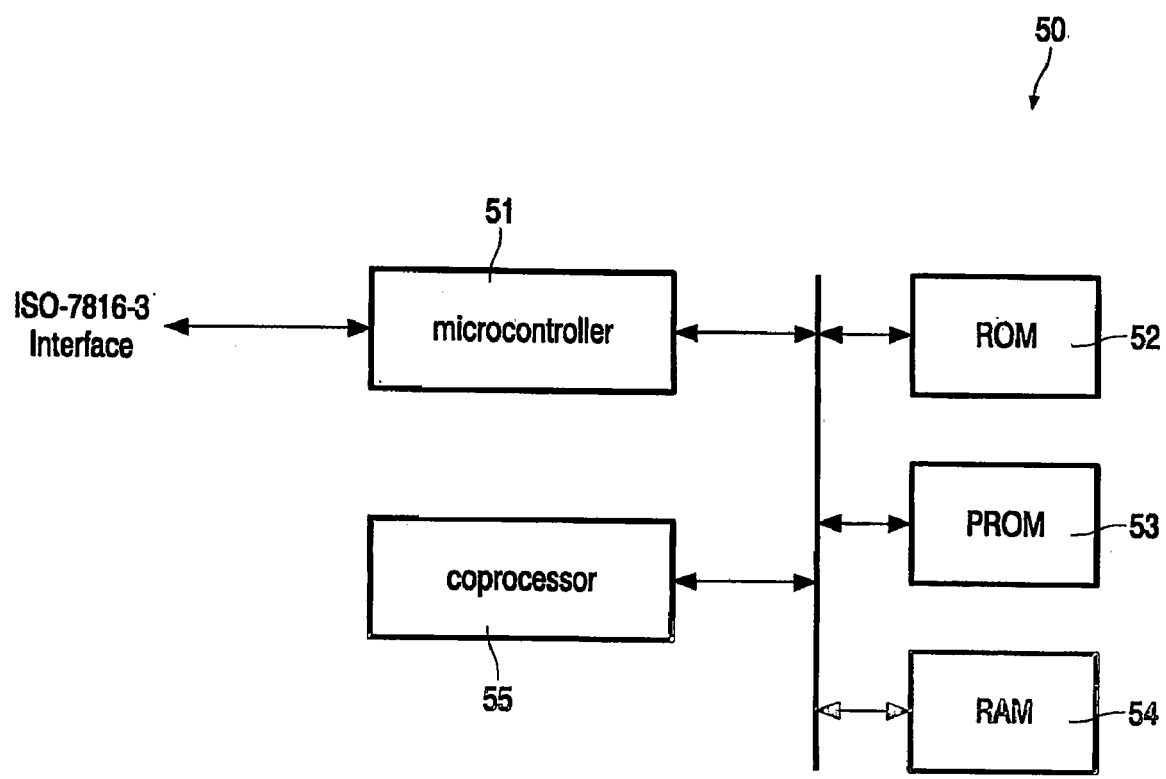
FIG. 1 is an application of the present invention in a smart card.
Figure 2:
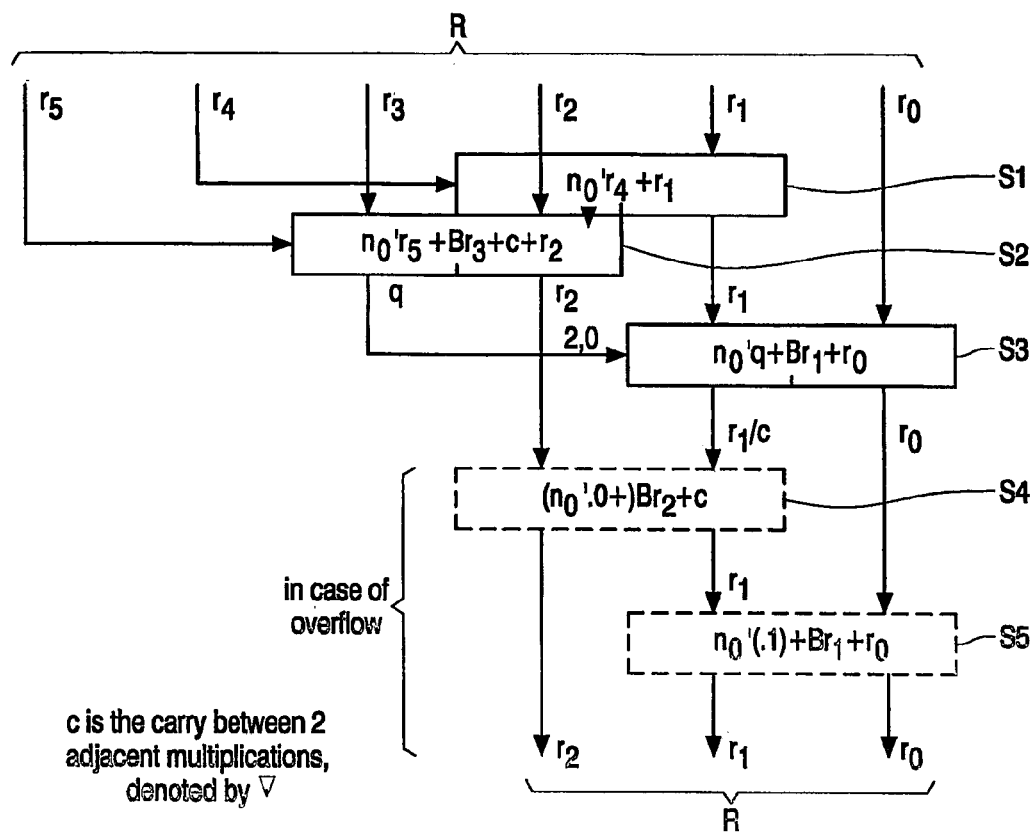
FIG. 2 is a schematic drawing of a reduction operation embodying the present invention for 192-bit ECC and 64-bit words.

There is shown in FIG. 2 a reduction operation of the present invention which is performed with a modulus comprising in total 192 bit words and having a first section which has all "1" states being two 64-bit words and 10 bits. The second section of the modulus is 54 bits and can be any number provided that the total number is a prime. The bigger the number, the less often that an additional reduction is required.

In general, N can be written as:

$$N = n_{m-1} B^{m-1} + \ldots n_1 B + n_0 \ (B = 2^{64})$$

The special requirements for the selection of N are:

n1 ... $n_{m-1}$ are fixed and contain only 1's ($n_1 = \ldots n_{m-1} = B-1$).

$n_0$ is general except for k MSBs which are also 1, leaving 64-k bits free to choose.

Then N is written as $$N = B^m - B + n_0 = B^m - n_0' \text{ with } n_0' = B - n_0$$

Let R be the result, which has to be reduced by 1 word.

$$R = r_m B^m + r_{m-1} B^{m-1} + \ldots r_1 B + r_0$$

Reduce the result by subtraction of the product $r_m N$ from R as follows:

$$R' = R - r_m \cdot N$$

$$= r_m B^m + r_{m-1} B^{m-1} + \ldots r_1 B + r_0 - r_m (B^m - B + n_0)$$

$$= r_{m-1} B^{m-1} + \ldots + r_2 B^2 + r_1 B + r_0 + r_m \cdot (B - n_0) = (R - r_m B^m) + r_m \cdot n_0'$$

This means that, for the reduction, omit the word $r_m$ and add to the Least Significant Word $r_0$ the product $r_m \cdot n_0'$. The reduction implies only one multiplication instead of the normal m multiplications.

$n_0'$ is always positive, since $n_0 < B$. The result is also always positive.

Instead of $n_0$, store and use $n_0'$.

In some cases, the result is 1 bit too large. Then it is necessary to subtract N again.

$$R' = (B^m + r_{m-1} B^{m-1} + \ldots + r_1 B + r_0) - (B^m - n_0') = r_{m-1} B^{m-1} + \ldots + r_1 B + (r_0 + n_0') = (R - B^m) + n_0'.$$

So, we have only to add $n_0'$ and discard the overflow bit $B^m$.

For every multiplication by one word, do such a reduction. Alternatively, do first all multiplications and then the reductions. The last method is described here. The description below is for 192-bit ECC and a 64-bit word size (m=3).

$$N = B^3 - B + n_0 = B^3 - n_0'; \ 2^9 \leq n_0 < B (B = 2^{64}).$$

R is the result of the multiplication of three 64-bit words by also three 64-bit words, which results in 6 words ($r_0 \ldots r_5$).

Then the reduction is done as follows:

Multiplication of $n_0'$ by $r_4$ and adding $r_1$ (being step S1);

Multiplication of $n_0'$ by $r_5$ and adding $r_2$, and the carry c of the previous multiplication. Moreover $r_3$ is added to the upper part of the multiplication. The result consists of the lower half again called $r_2$ and the upper half q (step S2);

Multiplication of q by $n_0'$ and adding $r_0$ and adding the new $r_1$ to the upper part (step S3);

When the last multiplication gives an overflow, the overflow is added to $r_2$ e.g by the multiplication of $n_0'$ by 0 (to give 0), the addition of $r_1$ (gives $r_1$ as lower half and the addition of $r_2$ to the upper part, i.e. the overflow bit) (step S4);

When this gives again an overflow (i.e. only when $r_2$ consists of all-ones (chance $2^{-64}$)), $n_0'$ is added (step S5).

This can be done by the multiplication of $n_0'$ by 1, and adding $r_0$ to the lower half of $r_1$ to the upper half.

The carry of the second multiplication (q) is used as multiplicand in the next multiplication, and can be enlarged by 1 bit.

When the input $r_1$ to the multiplication of $n_0'q$ does not have 8 leading ones (the probability being less than $1/256$), there will be no overflow, since $n_0'q$ has at least 8 leading zeros because of $n_0'$. In that case, the program does not wait for the overflow to proceed.

Handling of overflows involves time, which has to be minimised wherever possible. Accordingly, $n_0$ has a number of leading ones (k), so $n_0'$ has at least k−1 leading zeros.

Thus, the product $n_0' c_2$ has at least k−2 leading zeros, since q might be enlarged by 1 bit.

In order to produce an overflow, the addition of $B.c_0 + r_0$ has to have at least k−2 leading ones and a carry c from the lower bits.

The probability that this will happen is less than $2^{-(k-2)}$. Therefore by making k high, the likelihood of an overflow is very small.

The probability of the second overflow is extremely small ($2^{-64}$), since $r_2$ has to consist completely of ones.

In practice, a pipelined multiplier is used to provide efficient calculation operations, so a number of multiplications are being processed at the same time. It takes a few clock cycles to get the result from the multiplier. When it is necessary to wait to determine whether an overflow occurs, the next multiplications cannot begin until the overflow has been calculated. Thus $r_1$ is monitored and if it does not have k−2 leading "1"s there will be no overflow a few cycles later so the next multiplication can be started.

Figure 3:
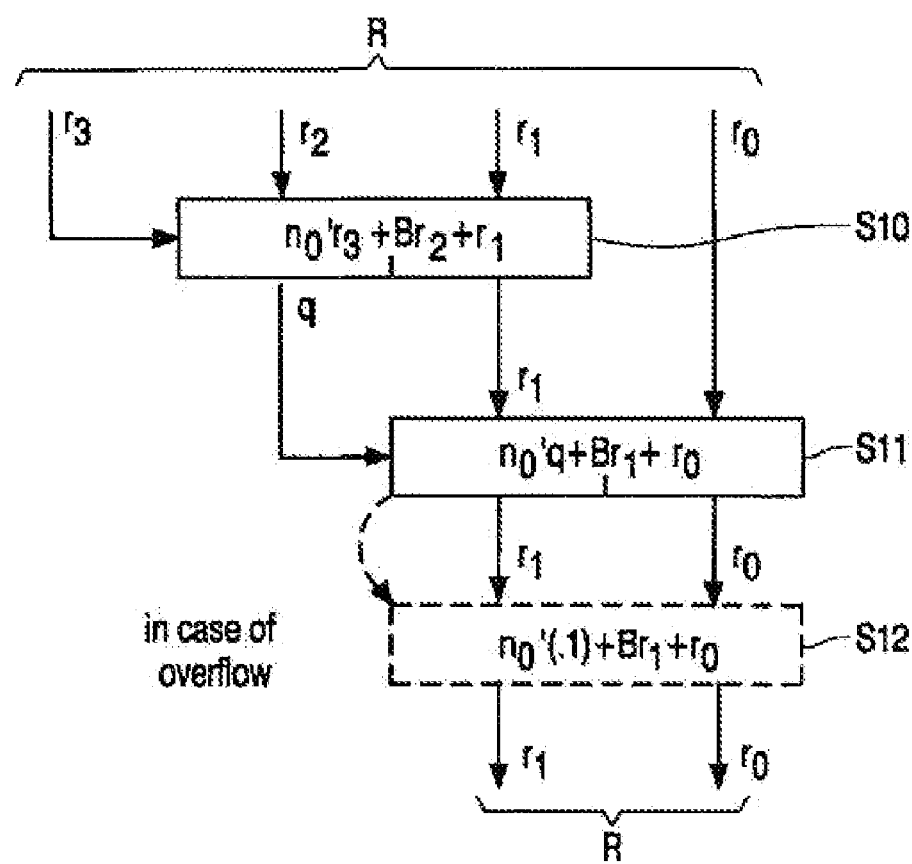
FIG. 3 is a schematic drawing of another reduction operation of the present invention for 128-bit ECC and 64-bit words.

There is shown in FIG. 3 a different embodiment for 128-bit ECC and a word size of 64-bit incorporating a modulus N having 128 bits.

In this embodiment, $$N = B^2 - B + n_0 = B^2 - n_0'; \ 2^9 \leq n_0 < B.$$

The operands have to be in normal space.
Then the reduction is done as follows:
Multiplication of $n_0'$ by $r_3$ and adding $r_1$. Also $r_2$ is added to the upper part of the multiplication (step S10); The result consists of the lower half again called $r_1$ and the upper half called q.
Multiplication of q by $n_0'$ and adding $r_0$ and adding the new $r_1$ to the upper part (step S11);
When the last multiplication gives an overflow then we add $n_0'$ (step S12), e.g. by the multiplication/addition $n_0' \cdot 1 + B \cdot r_1 + r_0$.

Figure 4:
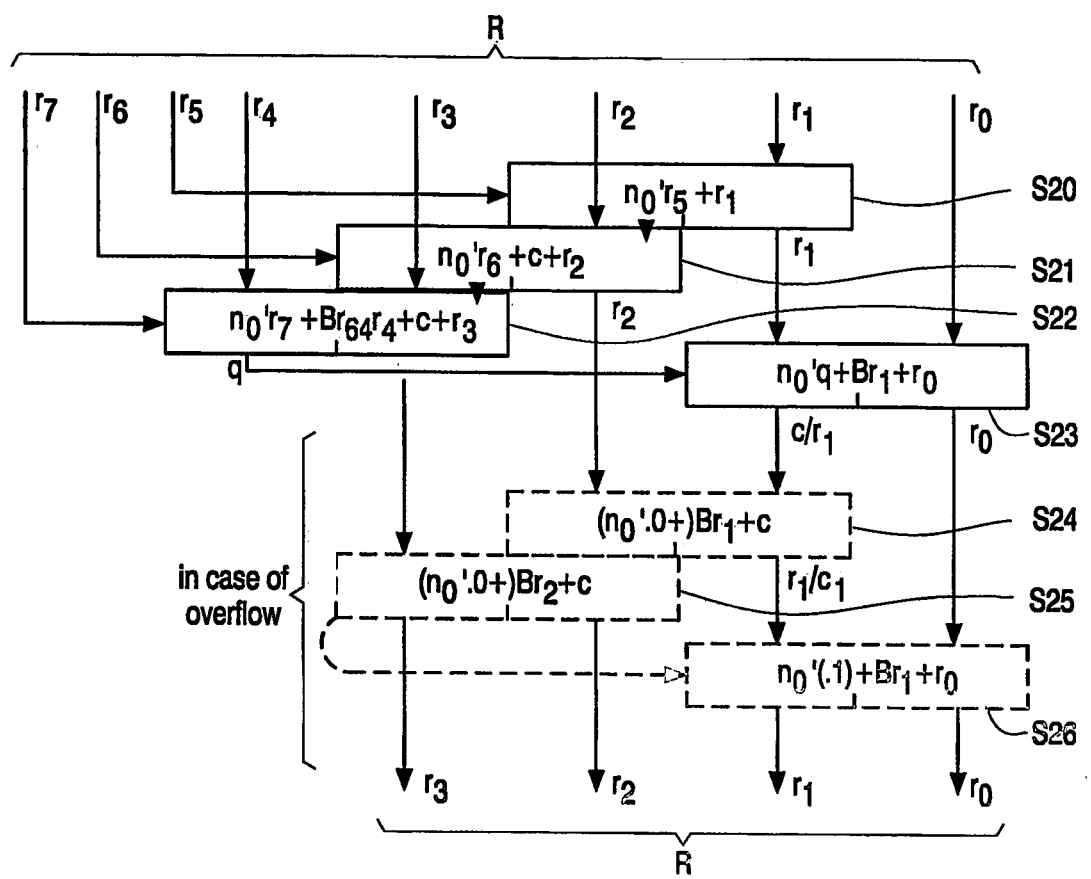
FIG. 4 is a schematic drawing of another reduction operation of the present invention for 256-bit ECC and 64-bit words.

There is shown in FIG. 4 a different embodiment for 256-bit ECC and a word size of 64-bit incorporating a prime number having 256 bits.

In this embodiment, $$N = B^4 - B + n_0 + B^4 - n_0'; \ 2^9 < n_0 < B.$$

The operands have to be in normal space.
Then the reduction is done as follows:
Multiplication of $n_0'$ by $r_5$ and adding $r_1$ (being step S20) with the new result called $r_1$;
Multiplication of $n_0'$ by $r_6$ and adding $r_2$ and the carry c of the previous multiplication (step S21) with the new result called $r_2$.
Multiplication of $n_0'$ by $r_7$ and adding $r_3$ and the carry c of the previous multiplication.
Moreover $r_4$ is added to the upper part of the multiplication (step S22). The step consists of the lower half again called $r_3$ and the upper half q.
Multiplication of q by $n_0'$ and adding $r_0$ and adding the new $r_1$ to the upper part (step S23);
When the last multiplication gives an overflow, the overflow is added to $r_2$ (step S24);
When this again gives an overflow, it is added to $r_3$ (step S25);
When this gives again an overflow, $n_0'$ is added (step S26).

The carry of the third multiplication (q) is used as multiplicand and in the next multiplication, and can be enlarged by 1 bit.

Figure 5:
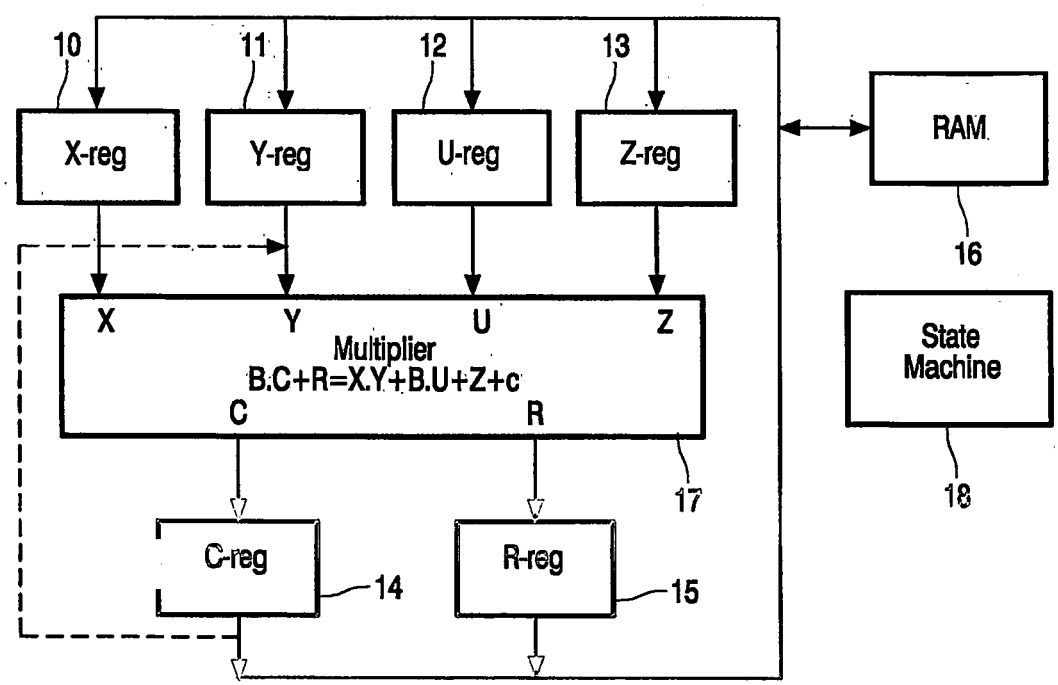
FIG. 5 is a hardware implementation of the present invention.

FIG. 5 is a block diagram of a hardware implementation of the present invention having the following components:
X-, Y-, U- and Z-registers 10 to 13 for storing the input operands X, Y, U and R respectively;
C- and R-register 14, 15 for storing outputs C and R;
RAM 16 for storing the intermediate results;
Multiplier 17 which performs the operation $B \cdot C + R = X*Y + B*U + Z + c$;
State machine 18 which controls the operations and the transport between RAM and registers or between registers.

Multiplier 17 calculates the product of X and Y and adds, if required, the previous carry c, which is internally stored. The result is split into two equal parts, Z being added to the lower half and U to the upper half.

The output of C-reg 14 can also be directly used as y-input (for example for q in FIG. 2).

In another form the present invention is implemented by software running on a microprocessor with appropriate ALU's to provide add, subtract and shift operations, and shift registers.

The invention claimed is:

1. A method of performing a reduction operation in a cryptographic calculation in a digital computer, the method comprising:
selecting a modulus having a first section with a plurality of "1" Most Significant Word states and a second section which further comprises: a plurality of "1" or "0" states whereby a number formed of the two sections is a modulus; and
operating a reduction operation on the modulus comprising:
multiplying a first variable $n_0'$ by a second variable $r_3$ to produce a first result;
adding the first result to a third variable $r_1$ and B multiplied by a fourth variable $r_2$ to produce a first sum, wherein the first sum corresponds to a first equation: $n_0' r_3 + B r_2 + r_1$;
dividing the first sum into an upper half and a lower half;
multiplying the upper half by the first variable $n_0'$ to produce a second result;
adding the second result to the lower half and a fifth variable $r_0$ to produce a second sum, thereby permitting use of the second sum as the modulus; and
using the modulus in the cryptographic calculation.

2. The method of claim 1, further comprising:
effecting a plurality of multiplication operations.

3. The method of claim 2, further comprising:
effecting a plurality of multiplication operations followed by effecting the reduction operation.

4. The method claim 3, further comprising:
repeating the effecting step of claim 3.

5. The method of claim 1, further comprising:
using a multiple of the modulus.

6. The method of claim 1, further comprising:
adding an overflow from a last multiplication to a part of a selected number.

7. The method of claim 6, further comprising:
adding the first variable $n_0'$ to the overflow.

8. The method of claim 1, wherein a carry c between two adjacent multiplications is effected as an addend in a subsequent multiplication.

9. The method of claim 1, further comprising:
monitoring a number of leading "1"s to determine if the number is less than (k−2).

10. The method of claim 9, further comprising:
initiating a next calculation.

11. The method of claim 1, the method further comprising:
operating 192-bit Elliptic Curve Crytography (ECC) and a word size of 64-bit,
the modulus comprises a first section of 138 bits and a second section of 54 bits.

12. The method of claim 1, the method further comprising:
operating 128-bit Elliptic Curve Crytography (ECC) and a word size of 64-bit,
the modulus comprises a first section of 74 bits and a second section of 54 bits.

13. The method of claim 1, the method further comprising:
operating 256-bit Elliptic Curve Crytography (ECC) and a word size of 64-bit,
the modulus comprises a first section of 202 bits and a second section of 54 bits.

14. A computer program product directly loadable into an internal memory of the digital computer, comprising:
software code portions for performing the method of claim 1 on the digital computer.

15. A computer program directly loadable into an internal memory of the digital computer, comprising:
software code portions for performing the method of claim 1 on the digital computer.

16. An apparatus that performs a reduction operation in a cryptographic calculation on a digital computer, the apparatus comprising:
a plurality of input registers that store a plurality of input operands;

a plurality of output registers that store a plurality of outputs; and a multiplier that produces said outputs using a function that operates on variables from both said input registers and said output registers; wherein said multiplier selects a modulus having a first section with a plurality of "1" states and a second section having a plurality of "1" or "0" states whereby a number formed of the two sections is a modulus and performs a reduction operation on the modulus, the reduction operation comprising:

multiplying a first variable $n_0'$ by a second variable $r_3$ to produce a first result;

adding the first result to a third variable $r_1$ and B multiplied by a fourth variable $r_2$ to produce a first sum, wherein the first sum corresponds to a first equation: $n_0'r_3+Br_2+r_1$;

dividing the first sum into an upper half and a lower half;

multiplying the upper half by the first variable $n_0'$ to produce a second result; adding the second result to the lower half and a fifth variable $r_0$ to produce a second sum, thereby permitting use of the second sum as the modulus; and using the modulus in the cryptographic calculation.

17. The apparatus of claim 16, further comprising:
means to effect a plurality of multiplication operations.

18. The apparatus of claim 17, further comprising:
means to effect a plurality of multiplication operations followed by the reduction operation.

19. The apparatus of claim 18, further comprising:
means to repeat the plurality of multiplication operations and the reduction operation.

20. The apparatus of claim 16, further comprising:
means to use a multiple of the modulus.

21. The apparatus of claim 16, further comprising:
means to add an overflow from a last multiplication to part of a selected number.

22. The apparatus of claim 21, further comprising:
means to add the first variable $n_0'$ to the overflow.

23. The apparatus of claim 16, further comprising:
means to effect a carry c between two adjacent multiplications as an addend in a subsequent multiplication.

24. The apparatus of claim 16, further comprising:
means to monitor a number of leading "1"s to determine if the number is less than (k−2).

25. The apparatus of claim 24, further comprising:
means to initiate a next calculation.

26. The apparatus of claim 16,
wherein the modulus comprises a first section of 74 bits and a second section of 54 bits.

27. The apparatus of claim 16,
wherein the modulus comprises a first section of 74 bits and a second section of 54 bits.

28. The apparatus of claim 16, wherein the modulus comprises a first section of 202 bits and a second section of 54 bits.

* * * * *